(12) United States Patent
Asish

(10) Patent No.: US 7,346,014 B2
(45) Date of Patent: Mar. 18, 2008

(54) SYSTEM AND METHOD FOR ECHO CANCELLATION

(75) Inventor: Makkattil R. Asish, Bangalore (IN)

(73) Assignee: Sasken Communication Technologies Ltd, Bangalore (IN)

( * ) Notice: Subject to any disclaimer, the term of this patent is extended or adjusted under 35 U.S.C. 154(b) by 185 days.

(21) Appl. No.: 11/262,007

(22) Filed: Oct. 28, 2005

(65) Prior Publication Data

US 2007/0097890 A1    May 3, 2007

(51) Int. Cl.
*H04B 3/20*    (2006.01)
(52) U.S. Cl. .................................. 370/286; 379/406.14
(58) Field of Classification Search ...................... None
See application file for complete search history.

(56) References Cited

U.S. PATENT DOCUMENTS 5,305,307 A * 4/1994 Chu ........................... 370/288
5,774,561 A * 6/1998 Nakagawa et al. ........... 381/66
6,628,781 B1 * 9/2003 Grundstrom et al. .. 379/406.14
2002/0191779 A1 * 12/2002 Pham .................... 379/406.08

\* cited by examiner

*Primary Examiner*—Ramnandan Singh
(74) *Attorney, Agent, or Firm*—William L. Botjer

(57) ABSTRACT

An apparatus and method for canceling an echo signal is disclosed. The apparatus includes an echo filter, an up-sampler, an interpolation filter, and a signal combining apparatus. The echo filter filters the transmitted signal, the up-sampler up-samples the output of the echo filter, the interpolation filter filters the up-sampled output to generate a signal that emulates the echo signal, and the signal combining apparatus combines the signal emulating the echo signal with the received signal to remove echo signal. The method estimates an impulse response of the echo channel for estimation of filter coefficients of an echo filter. The transmit signal is then filtered in the echo filter to generate an output, which is up-sampled to generate another output. The up-sampled output is filtered by the interpolation filter to generate a signal that emulates the echo signal, which is then combined with the received signal to cancel the echo signal.

23 Claims, 11 Drawing Sheets

SYSTEM AND METHOD FOR ECHO CANCELLATION

BACKGROUND

The present invention relates generally to systems and methods for echo cancellation in data communication systems. In particular, the present invention relates to systems and methods for estimation of echo filter coefficients, which are used for echo cancellation.

Echo cancellation finds application in various areas. One such area is the field of multi-carrier data communications. Various multi-carrier communication systems are utilized for transmission of data. One popular multi-carrier technique utilized is Discrete Multi-Tone (DMT). Asymmetric Digital Subscriber Line (ADSL) is a standard that utilizes the DMT technique for high-speed data communication over phone lines. In the ADSL standard, the rate of transmission and reception of data are not equal. Other popular techniques utilized in multi-carrier systems include Orthogonal Frequency Division Multiplexing (OFDM), and frequency division multiplexing (FDM).

Conventional data communication systems utilizing the above-mentioned techniques typically include a Central Office (CO) terminal connected through a physical medium to one or more Customer Premises Equipment (CPE). The physical medium includes copper cable, hybrid fiber, powerline, and wireless medium.

In order to enable communication between the data communication systems, cables and modems are utilized. The modems include necessary circuits, which are adapted to receive and transmit data through the cable. The modem has a transmitter and a receiver that are coupled together through a hybrid circuit. In multi-carrier communication systems that employ Frequency Division Multiplexed (FDM) sub-carriers to transmit data across a communication channel, an echo signal gets introduced in the received signal by the transmitted signal.

The echo signal is introduced in the received signal as a result of the transients introduced in the received signal at frame boundaries. Although transmit and receive bands are separate, some amount of transmit signal leaks into the receive band, thereby generating the echo signal.

The echo signal is introduced into the hybrid circuit through the transmitter and is received along with the received signal at the receiver. In order to enable a decipherable communication, the echo signal needs to be removed from the received signal. The methodology involved in this process includes, reconstruction of the echo signal and echo signal compensation by combining the reconstructed echo signal with the received signal.

Conventional systems and methods available for echo cancellation employ complex training process and are generally not computationally efficient. Further, these systems and methods do not cancel out the echo signal completely. Also, the training process used for estimating the echo filter coefficients is complex.

In light of the foregoing discussion, there is a need for a system and method that employs a simple training process, reduces computational overload, and provides perfect echo cancellation for enabling efficient communication.

SUMMARY

An object of the invention is to provide a computationally efficient apparatus and method for canceling out echo signal from data communication systems.

The present invention provides an apparatus and method for canceling an echo signal in a communication system. The apparatus disclosed in the present invention includes an echo filter, an up-sampler, an interpolation filter, a down sampler, and a signal combining apparatus. The apparatus removes the echo signal from the data communication system. The echo signal is removed by combining with a signal, which emulates the echo signal, with the signal that is received by the data communication system.

The method disclosed in the present invention estimates an impulse response of the echo channel followed by estimation of filter coefficients of an echo filter. The coefficients of the echo filter are estimated based on band-limited impulse response of the echo channel. The transmit signal, which is transmitted by the data communication system, in the echo filter is then filtered to generate an echo filter output. The echo filter output is then up-sampled to generate an up-sampled output, which is filtered by the interpolation filter to generate a signal that emulates the echo signal. The signal that emulates the echo signal is then combined with the signal received by the data communication system to cancel the echo signal.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF THE PREFERRED EMBODIMENTS

The present invention provides for an apparatus and method for cancellation of echo signal in data communication systems. The present invention generates a signal that is a replica of the echo signal that gets introduced in the data communication system. This generated signal is then utilized to cancel out the echo signal from the received signal in a communication system. The invention performs a time domain echo cancellation. In various embodiments, the invention may be implemented over communication systems operating over different kinds of communication channels such as ADSL system.

Figure 1:
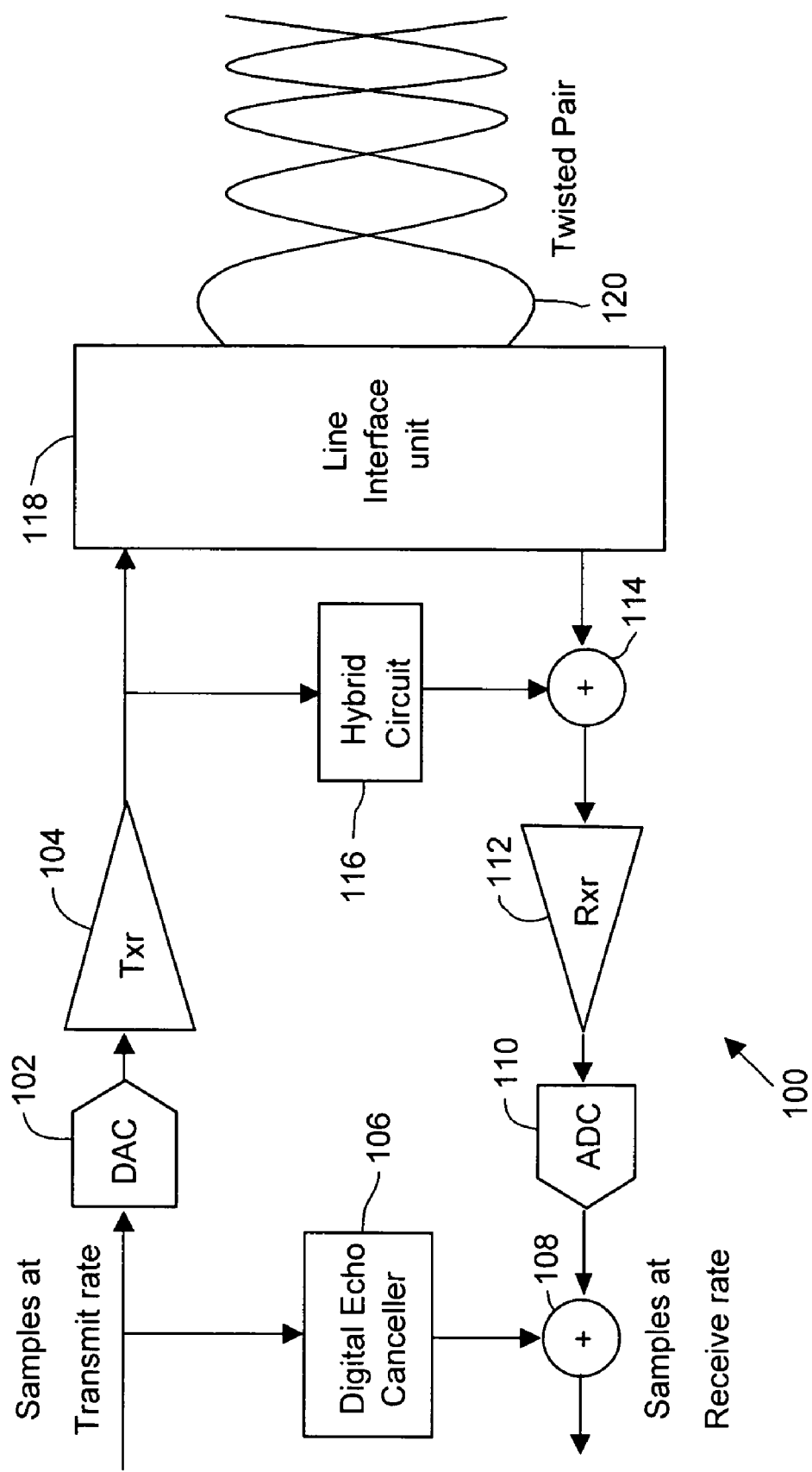
FIG. 1 is a block diagram illustrating customer premises equipment used in a data communication system.

FIG. 1 is a block diagram illustrating customer premises equipment used in a data communication system. Customer premises equipment 100 includes a digital to analog converter (DAC) 102, a transmitter (Txr) 104, a digital echo canceller 106, a first signal combiner 108, an analog to digital converter (ADC) 110, a receiver (Rxr) 112, a second signal combiner 114, a hybrid circuit 116, and a line interface unit 118. It should be noted that Txr 104 is a near end transmitter. Customer premises equipment 100 is connected to the data communication system through a twisted pair 120.

The data samples that are required to be communicated are first generated and fed to the DAC 102. At DAC 102, the data samples, which are in digital form, are converted to analog signal and then fed to Txr 104. Txr 104 amplifies the power of the analog signal so that it can be transmitted through line interface unit 118 and twisted pair 120 for a longer distance. Txr 104 may be an amplifier/buffer/power booster that can boost the power of the analog signal.

Similarly, analog signal that is received by customer premises equipment 100 through twisted pair 120 and line interface unit 118 is fed to Rxr 112. Rxr 112 amplifies the power of the input analog signal so that it may be sampled using ADC 110 at adequate resolution, where it is converted to digital signal, and processed. Rxr 112 may be an amplifier/buffer/power booster. It should be noted that Rxr 112 may also include data processing blocks, other than an amplifier block for amplifying the input analog signal, in accordance with various embodiments of the invention.

First signal combiner 108 and second signal combiner 114 combine the signals that these units are connected to, with appropriate polarity. An echo signal is generated in the communication channel between Txr 104 and Rxr 112. Hybrid circuit 116 is a device, which reduces the echo signal in Rxr 112, using an analog circuitry. Hybrid circuit 116 is an interface between Txr 104 and Rxr 112. Hybrid circuit 116 is used to separate signals of different frequency bands. Hybrid circuit 116 matches the line impedance and reduces the echo signal prior to digital echo canceller 106 being applied. Digital echo canceller 106 is connected between the input of DAC 102 and output of ADC 110. Digital echo canceller 106 is utilized for canceling the echo that is generated in customer premises equipment 100. Digital echo canceller is hereinafter referred to as echo canceller.

In order to efficiently cancel the echo signal that is introduced in the data communication system, an apparatus is introduced between the transmitting side and the receiving side of the data communication system. The apparatus is an echo canceller that cancels echo signal from the data communication system. The transmitting side of the data communication system is the transmitter that transmits data and the receiving side is the one that receives data.

Figure 2:
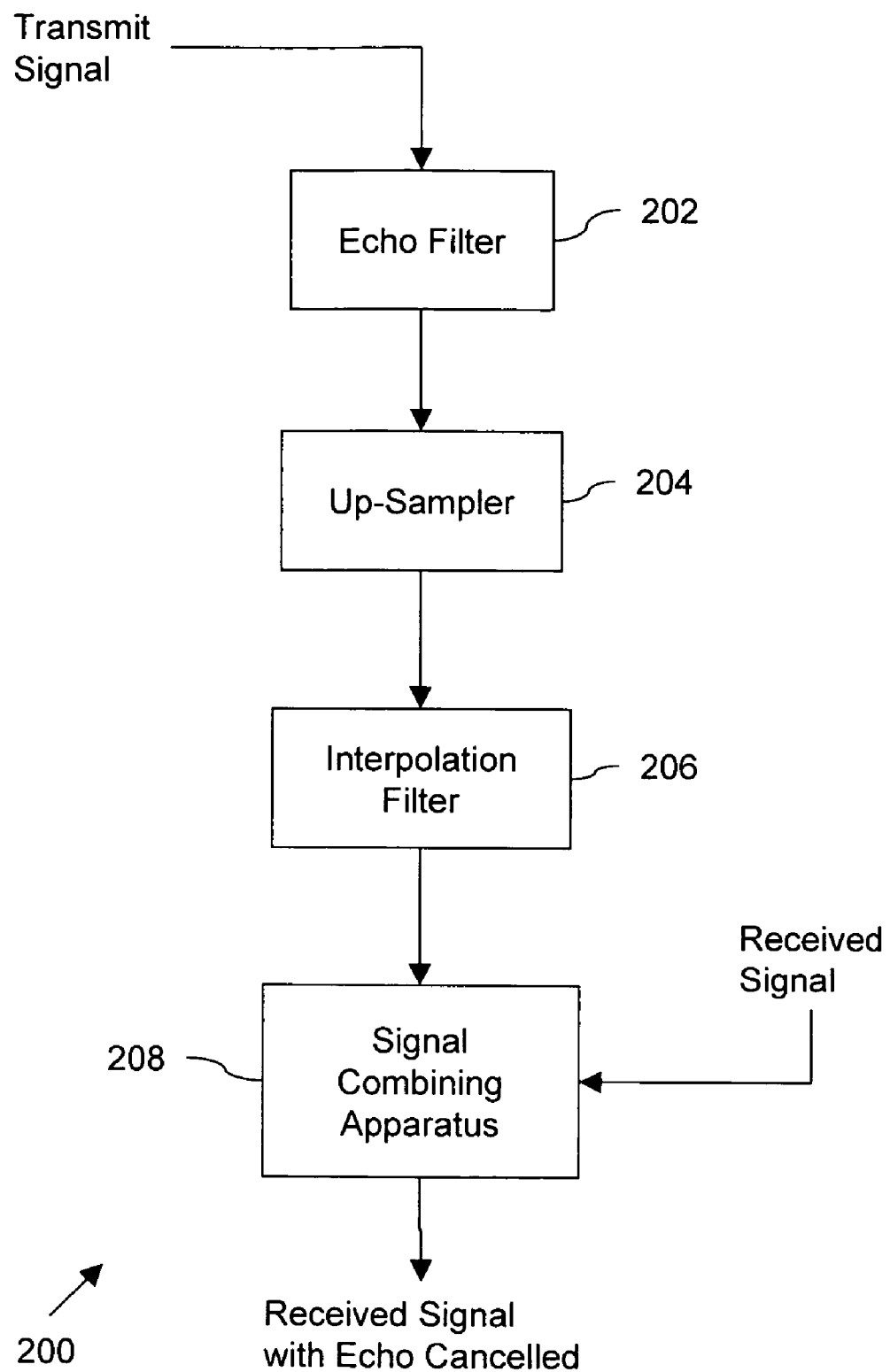
FIG. 2 is a block diagram illustrating an apparatus for echo cancellation, in accordance with an exemplary embodiment of the present invention.

FIG. 2 is a block diagram illustrating an apparatus for echo cancellation, in accordance with an exemplary embodiment of the present invention. An echo canceller 200 includes an echo filter 202, an up-sampler 204, an interpolation filter 206, and a signal combining apparatus 208. The transmission of data is done at a transmit rate through a transmit signal and reception of data is done at a receive rate through a receive signal. The receive signal includes the echo signal, which is generated in the system.

It should be noted that the term 'transmit rate' indicates the basic rate at which data samples are generated and transmitted. It is to be understood that in general, 'transmit rate' is a term used to indicate the rate at which digital words corresponding to analog voltages are fed to DAC 102. It should also be noted that 'transmit rate' might be same as the data rate at which DAC 102 is fed, in cases where there may be filters, up-samplers, etc., before DAC 102.

Echo filter 202 is utilized for filtering a transmit signal, which is being communicated by the system, and to generate an output that is utilized in the generation of a replica of the echo signal. The coefficients of echo filter 202 are computed by estimating a band-limited impulse response of the echo channel. In an embodiment of the invention, the coefficients of echo filter are generated by down sampling the band-limited impulse response. The components of the down-sampled band-limited impulse response are used to generate the coefficients of echo filter 202. The down-sampling is done by a factor of the ratio between transmit and receive sample rate to get a set of filters that together constitute echo filter 202.

It is to be noted that band limiting the impulse response corresponds to retaining the impulse response in a required frequency band only. The other components of the impulse response may be dropped.

In an embodiment of the present invention, echo filter 202 is a non-adaptive filter. In another embodiment of the present invention, echo filter 202 is an adaptive filter. It should be noted that an adaptive filter is a filter, the filter coefficients of which may be adjusted as per requirement. The filter coefficients of such filters may be changed with time and hence the filter is termed as 'adaptive filter'. A non-adaptive filter is one that does not qualify as an adaptive filter, i.e., the filter coefficients of the filters may not be changed once they are estimated initially. An exemplary method for computing the filter coefficients of echo filter 202 is described in detail in conjunction with FIG. 10.

Up-sampler 204 is utilized for up-sampling the output of echo filter 202. Up-sampling is the process of increasing the rate of data samples. In an embodiment of the invention, up-sampling is done in order to generate data samples at the receive rate, which is higher than the transmit rate. The output of echo filter 202 is up-sampled by a factor equal to the ratio between the receive rate and the transmit rate.

In an embodiment of the invention, the up-sampling factor may be a multiple of the factor equal to the ratio between the receive rate and the transmit rate. In an embodiment of the present invention, the up-sampling factor is twice the factor equal to the ratio between the receive rate and the transmit rate. In another embodiment of the present invention, the up-sampling factor is four times the factor equal to the ratio between the receive rate and the transmit rate. The up-sampling ratio may also depend on the down-sampling factor that is used in a down-sampler utilized in the apparatus for echo cancellation.

In an embodiment of the present invention, the receive rate is greater than the transmit rate. It should be noted that the same invention may be practiced for a receive rate that might be lower than the transmit rate. It is to be noted that up-sampler 204 is known in the art and its implementation should be apparent to a person skilled in the art.

The output of up-sampler 204 is fed to interpolation filter 206. Interpolation filter 206 is utilized for filtering the up-sampled output of up-sampler 204 and it generates a signal that emulates the echo signal. Interpolation filter 206 may be implemented in several ways. One such embodiment of interpolation filter is described in detail, in conjunction with FIG. 3.

The echo signal is removed by combining the emulated echo signal, which is generated as an output of interpolation filter 206, with the received signal that includes the echo signal. Signal combining apparatus 208 is utilized for combining the signal emulating the echo signal with the receive signal. The output of signal combining apparatus 208 is a signal that does not contain the echo signal and may be utilized as the received signal free of echo signal.

Various other embodiments and modifications are possible that may be implemented from the above described apparatus. It is to be noted that the order in which the various components are connected together in the apparatus may also be changed in order to achieve desired functionality.

The various filters utilized in the apparatus for echo cancellation may be implemented in the form of filter-banks to reduce computational complexity of the apparatus and also to enhance efficiency during echo cancellation in the data cancellation system. It is to be noted that a filter-bank is a set of filters connected in parallel, wherein each filter in the filter-bank operates on a part of the input signal that is mutually exclusive from other parts of the input signal that are being operated upon by other filters in the filter-bank. The filter-bank isolates different frequency components in the input signal. The output of the filter-bank is a collective signal that is the sum of all the outputs of each of the filters in the filter-bank. For example, a filter-bank may comprise a series of high pass and low pass filters to repeatedly divide the input frequency range. The high pass and the low pass filters may be specified by specifying the filter coefficients.

Figure 3:
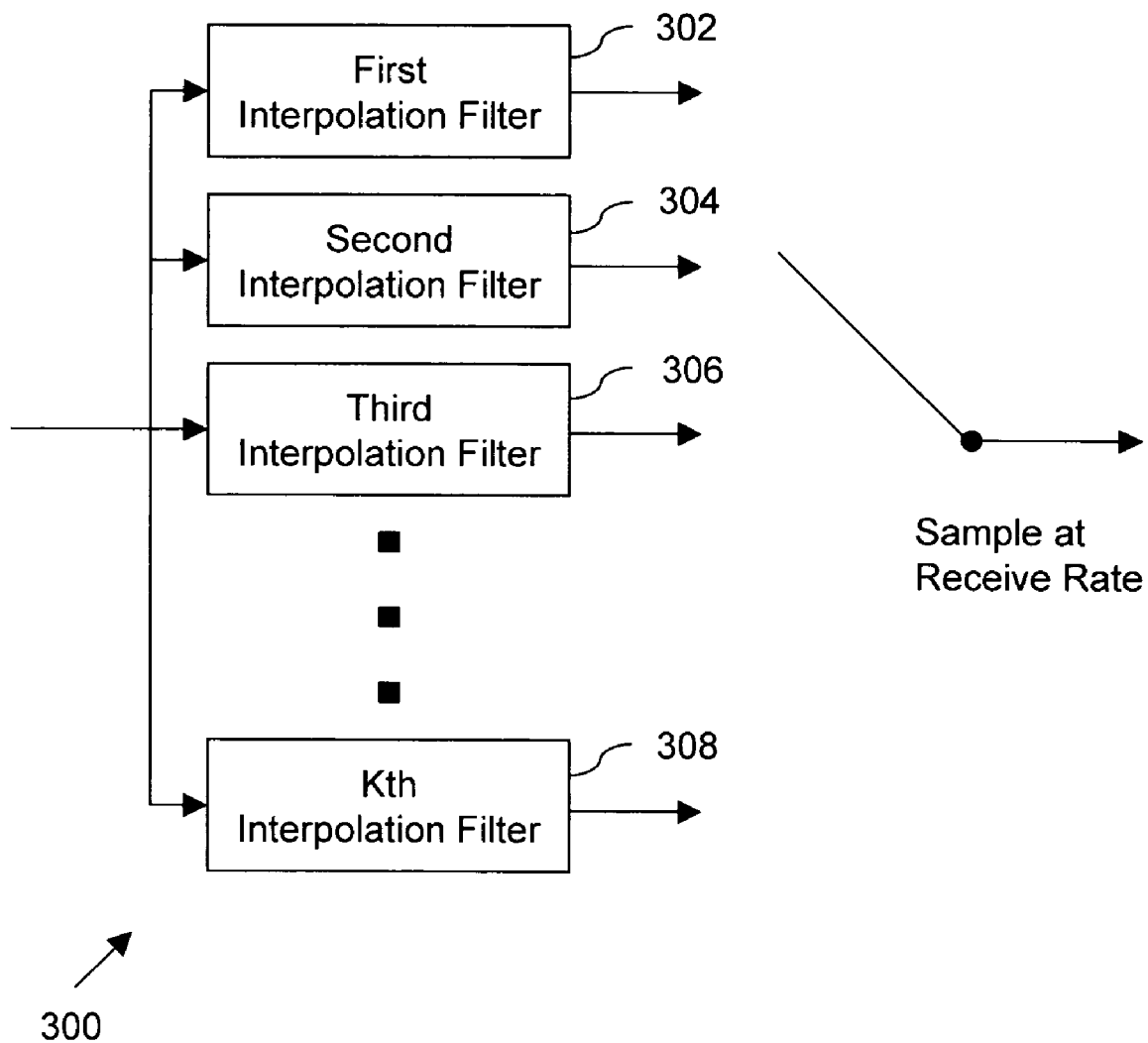
FIG. 3 is a block diagram illustrating an interpolation filter, in accordance with an exemplary embodiment of the present invention.

FIG. 3 is a block diagram illustrating an interpolation filter, in accordance with an exemplary embodiment of the present invention. In various embodiments of the present invention, an up-sampler followed by an Interpolation filter 300 is implemented in the form of filters-banks to reduce the computational load. Interpolation is a process of up sampling a signal followed by filtering. Examples of interpolation include linear interpolation, polynomial interpolation and spline interpolation. Interpolation filter 300 is used for producing in-between samples using the original samples. Interpolation increases the sampling rate at the output of the system. Interpolation filter 300 includes a first interpolation filter 302, a second interpolation filter 304, a third interpolation filter 306, and other interpolation filters up to a $K^{th}$ interpolation filter 308. The filter bank of these interpolation filters reduces the computational complexity and load of echo canceller. The output of each of the interpolation filters operating at a lower rate is then taken and multiplexed to generate a composite data sample at a receive rate.

Figure 4:
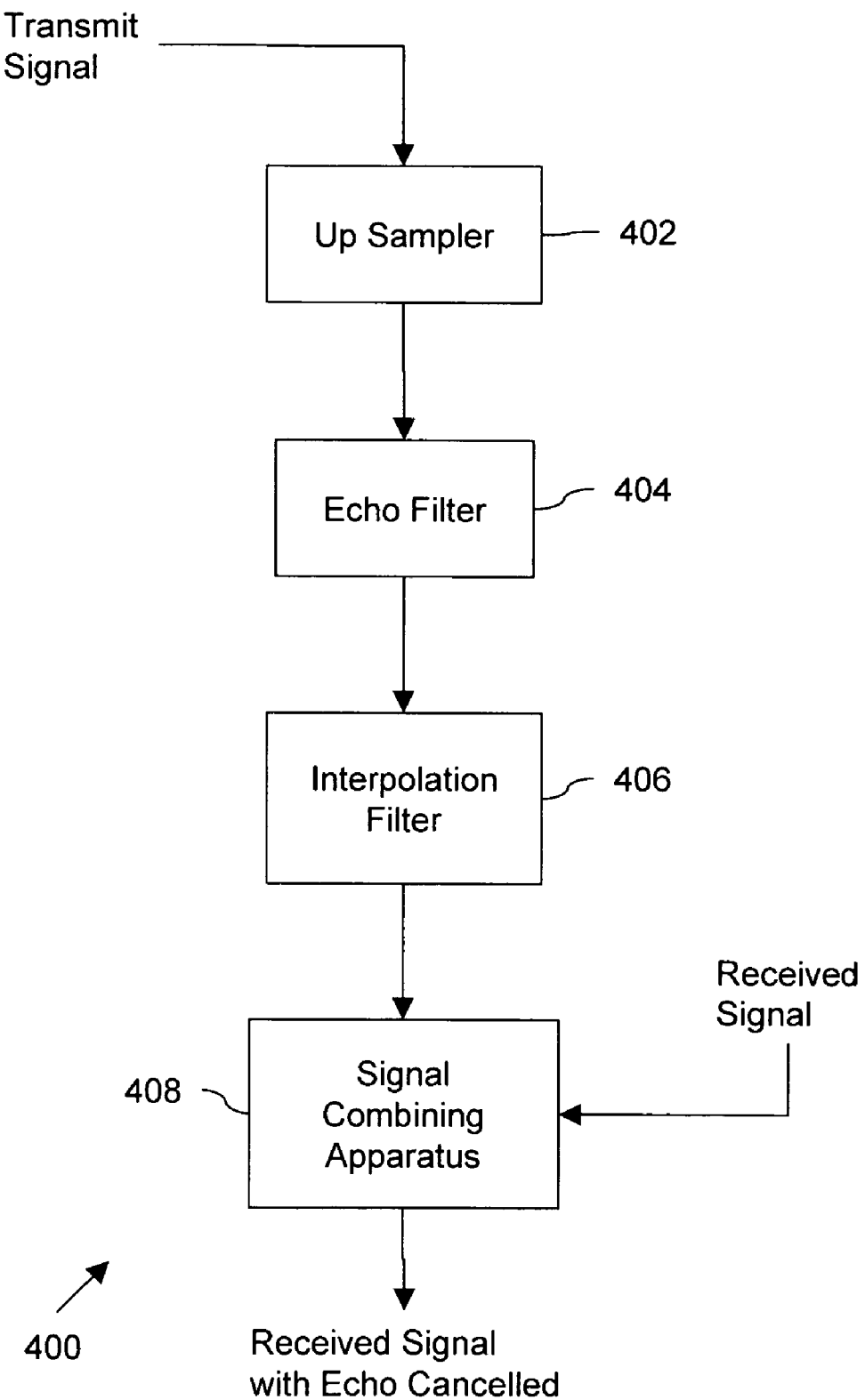
FIG. 4 is a block diagram illustrating an apparatus for echo cancellation, in accordance with yet another exemplary embodiment of the present invention.

FIG. 4 is a block diagram illustrating an apparatus for echo cancellation, in accordance with yet another exemplary embodiment of the present invention. An echo canceller 400 includes an up-sampler 402, an echo filter 404, an interpolation filter 406, and a signal combining apparatus 408. The transmission of data is done at a transmit rate through a transmit signal and reception of data is done at a receive rate through a receive signal. The receive signal includes the echo signal, which is generated in the system.

Up-sampler 402 is utilized for up-sampling the transmit signal. Up-sampling is done in order to generate data samples at the receive rate, which is higher than the transmit rate in an embodiment of the present invention. The transmit signal is up-sampled by a factor equal to the ratio between the receive rate and the transmit rate.

Echo filter 404 is utilized for filtering the up-sampled transmit signal, which is being communicated by the system, and to generate an output that is utilized in the generation of a replica of the echo signal. The coefficients of echo filter 404 are computed by estimating a band-limited impulse response of the echo channel. Echo filter 404 may be implemented in several ways. One such embodiment of echo filter is described in detail, in conjunction with FIG. 6.

The output of echo filter 404 is fed to interpolation filter 406. Interpolation filter 406 is utilized for filtering the output of echo filter 404 and it generates a signal that emulates the echo signal.

In an embodiment of the present invention, echo filter 404 and interpolation filter 406 can be combined such that the combined filter generates a signal emulating the echo signal. In an embodiment of the invention, the combined filter in combination with an up sampler can be implemented efficiently in the form of a filter bank. An exemplary combined filter is described in conjunction with FIG. 6.

The echo signal is removed by combining the emulated echo signal, which is generated as an output of interpolation filter 406, with the received signal that comprises the echo signal. Signal combining apparatus 408 is utilized for combining the signal emulating the echo signal with the receive signal. The output of signal combining apparatus 408 is a signal that does not contain the echo signal and may be utilized as the received signal free of echo signal.

Figure 5:
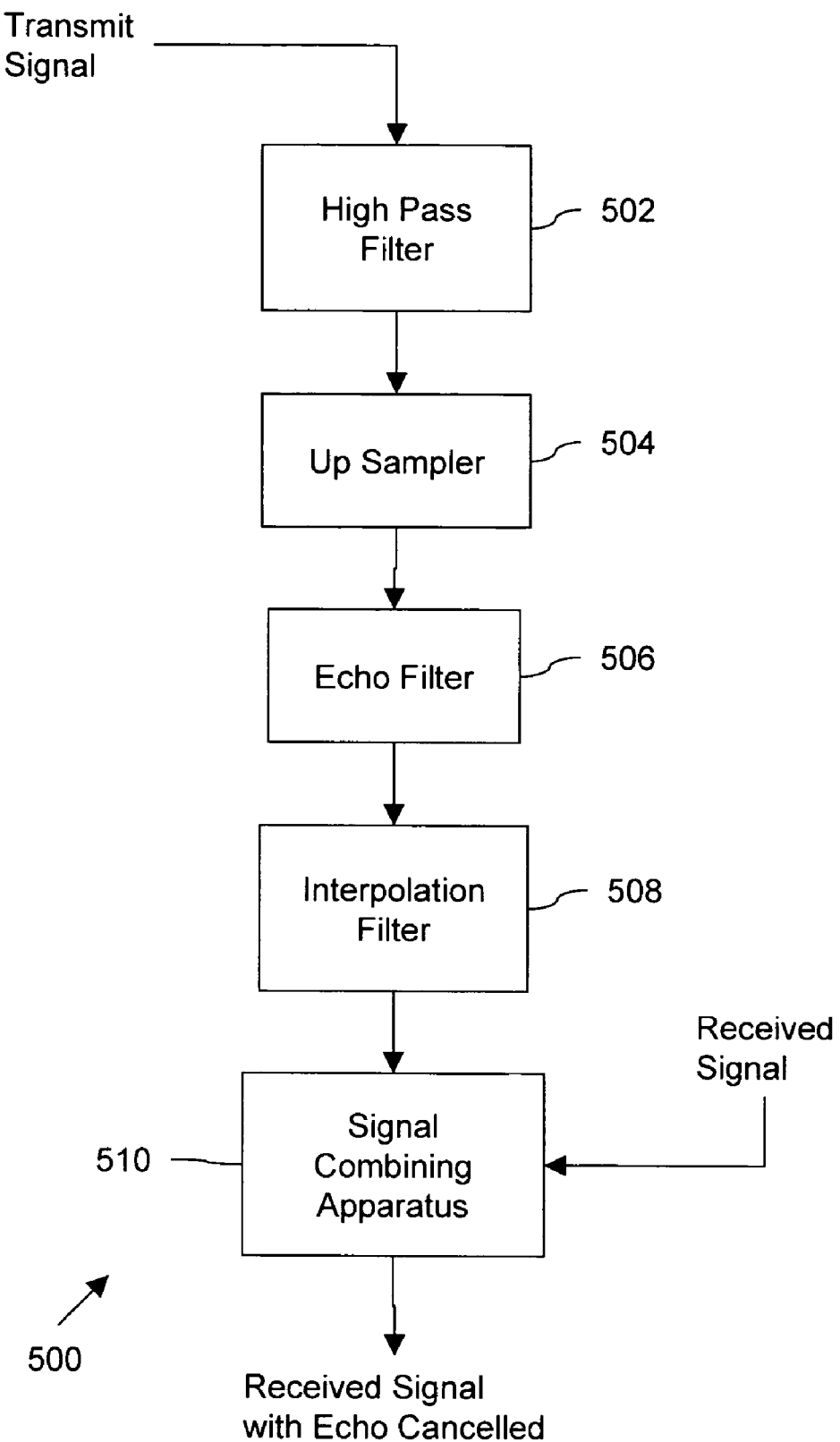
FIG. 5 is a block diagram illustrating an apparatus for echo cancellation, in accordance with yet another exemplary embodiment of the present invention.

FIG. 5 is a block diagram illustrating an apparatus for echo cancellation, in accordance with yet another exemplary embodiment of the present invention. An echo canceller 500 includes a high pass filter 502, an up-sampler 504, an echo filter 506, an interpolation filter 508, and a signal combining apparatus 510. Echo canceller 500 is similar to echo canceller 400, however, echo canceller 500 has high pass filter 502 unlike echo canceller 400. In an embodiment of the present invention, high pass filter 502 is one of a linear phase filter and a finite impulse response filter.

High pass filter 502 is utilized for filtering the transmit signal. High pass filter 502 is employed to operate echo filter 506 at a higher precision. The computational load handled by echo canceller 500 may be given by:

$$C = r_t * [n_1(+) + n_1(\times)] + r_r * [n_2(+) + n_2(\times)] \qquad (1)$$

where C is the computational load per frame, $r_t$ is the number of transmit samples per frame, $r_r$ is the number of receiver samples per frame, n1 is the number of taps of the filter which is a combination of echo filter and the interpolation filter, and $n_2$ is the number or high pass filter 502 taps. N(+) represents the number of addition operations to be performed per frame, while N(×) represents the number of multiplication operations to be performed per frame.

The other components of echo canceller 500 are similar to the corresponding components of echo canceller 400.

It should be noted that implementing echo filter 506 also as a filter-bank can further reduce the computational load.

Figure 6:
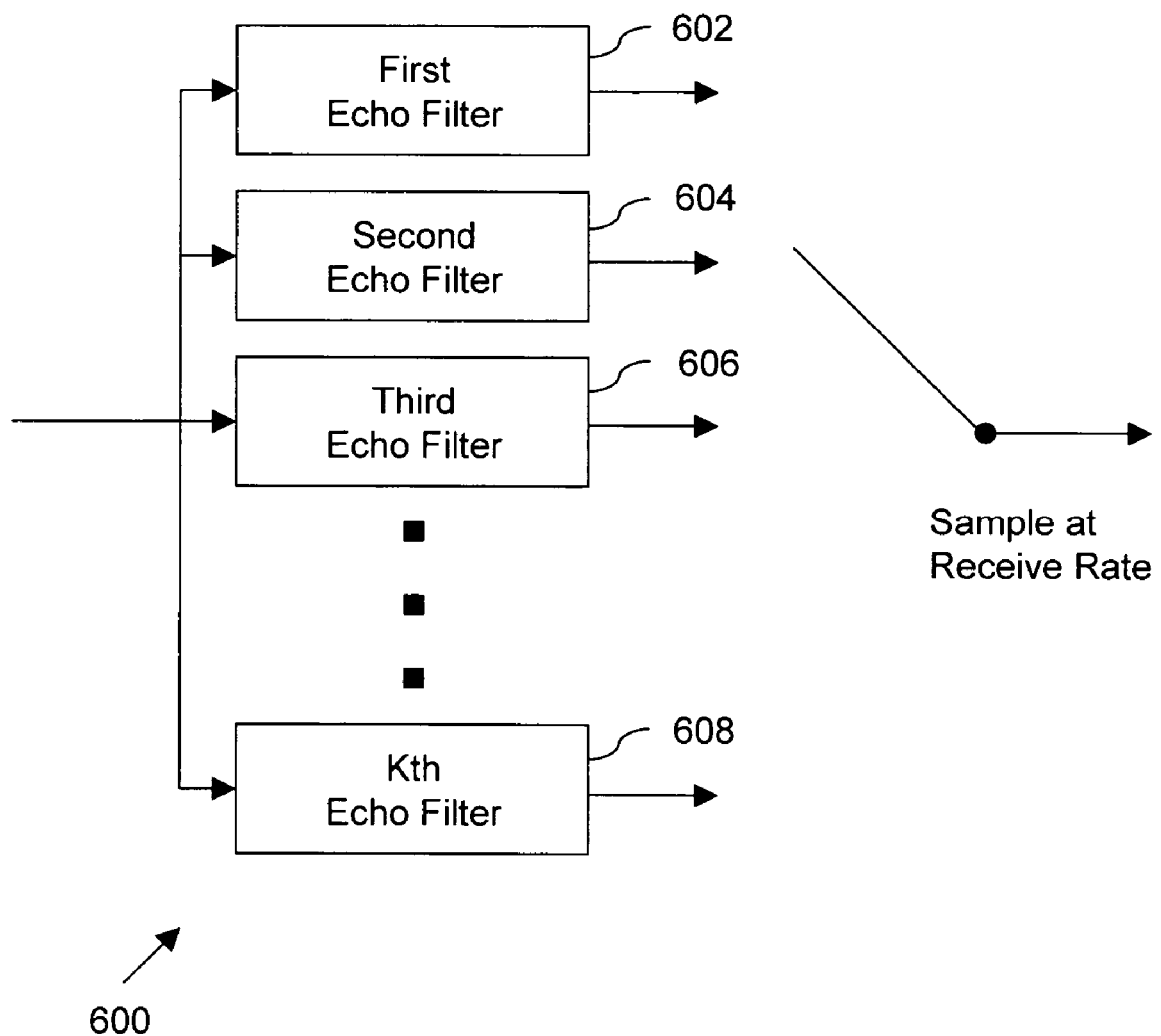
FIG. 6 is a block diagram illustrating an echo filter, in accordance with an exemplary embodiment of the present invention.

FIG. 6 is a block diagram illustrating an echo filter 600, in accordance with an exemplary embodiment of the present invention. Echo filter 600 is implemented in the form of filters-banks to reduce the computational load. Echo filter 600 includes a first echo filter 602, a second echo filter 604, a third echo filter 606, and other echo filters up to a $K^{th}$ echo filter 608. The optimum number of filters in a filter-bank is estimated by the signal-to-noise ratio (SNR) desired in the system. Lesser number of filters provides lower value of SNR compared to higher number of filters. The filter-bank of these echo filters reduces the computational complexity and load and help increase the efficiency of echo canceller. The echo filters are connected in parallel with respect to the up-sampler output. Each echo filter is operated for generating one output sample at the receive rate. The output of each of the echo filters is then multiplexed to generate a composite data sample at a receive rate. Each echo filter $e_i(n)$ within echo filter 600 is given by:

$e_i(n), 0<i<K$, such that, $e_i(n)=e(nK+i)$: $i=0 \leq i<K$, wherein $e(n)$ represents echo filter 600.

The computational load handled by echo canceller 500 in this embodiment is given by:

$$C = r_t * [n_1(+) + n_1(\times)] + 1/K * r_r * [n_2(+) + n_2(\times)] \quad (2)$$

where C is the computational load per frame, $r_t$ is the number of transmit samples per frame, $r_r$ is the number of receiver samples per frame, $n_1$ is the number of taps of echo filter 506, $n_2$ is the number of taps of high pass filter 502, and K is the up sampling factor. N(+) represents the number of addition operations to be performed per frame, while N(×) represents the number of multiplication operations to be performed per frame.

Figure 7:
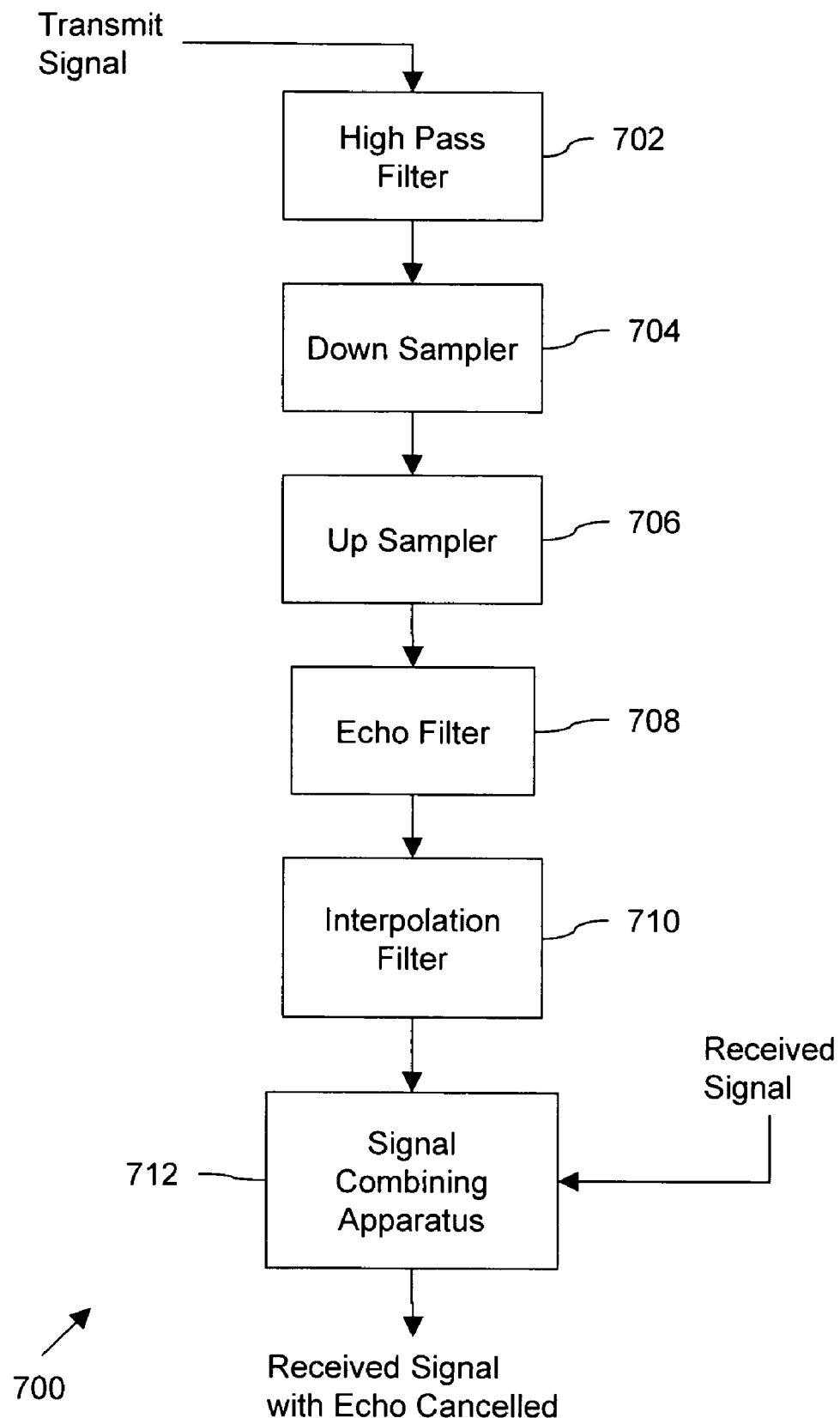
FIG. 7 is a block diagram illustrating an apparatus for echo cancellation, in accordance with yet another exemplary embodiment of the present invention.

FIG. 7 is a block diagram illustrating an apparatus for echo cancellation, in accordance with yet another exemplary embodiment of the present invention. An echo canceller 700 includes a high pass filter 702, a down-sampler 704, an up-sampler 706, an echo filter 708, an interpolation filter 710, and a signal combining apparatus 712. Echo canceller 700 is similar to echo canceller 500, however, echo canceller 700 has down-sampler 704 and a high pass filter unlike echo canceller 500.

In an embodiment of the present invention, high pass filter 702 is implemented using a second set of filters, where the filters in the second set of filters are given by:

$h_i(n), 0<i<$ such that $h_i(n)=h(nP+i)$: $i=0 \leq i<P$ where P is the down sampling factor.

Down-sampler 704 is utilized for down-sampling the output of high pass filter 702. The down-sampling factor is based on the ratio between transmit and receive sample rate and the frequency band of interest of the transmit signal. The other components of echo canceller 700 are similar to the corresponding components of echo canceller 500. The computational load for this case is given by:

$$C = r_t * [n_1(+) + n_1(\times)]/P + 1/K * r_r * [n_2(+) + n_2(\times)] \quad (3)$$

where C is the computational load per frame, $r_t$ is the number of transmit samples per frame, $r_r$ is the number of receiver samples per frame, $n_1$ is the number of 708 of echo filter taps, $n_2$ is the number of taps of high pass filter 702, P is the down sampling factor, and K is the upsampling factor. N(+) represents the number of addition operations to be performed per frame, while N(×) represents the number of multiplication operations to be performed per frame. A typical value of P and K are 4 and 16 respectively.

The apparatus described above may be implemented in other embodiments by combining the various elements together. For example, echo filter 708 and interpolation filter 710 may be combined together in a single filter or filter-bank to achieve similar functionality. It is to be noted that various other such combinations of components is possible for the apparatus described above without diverting from the scope and spirit of the invention.

Figure 8:
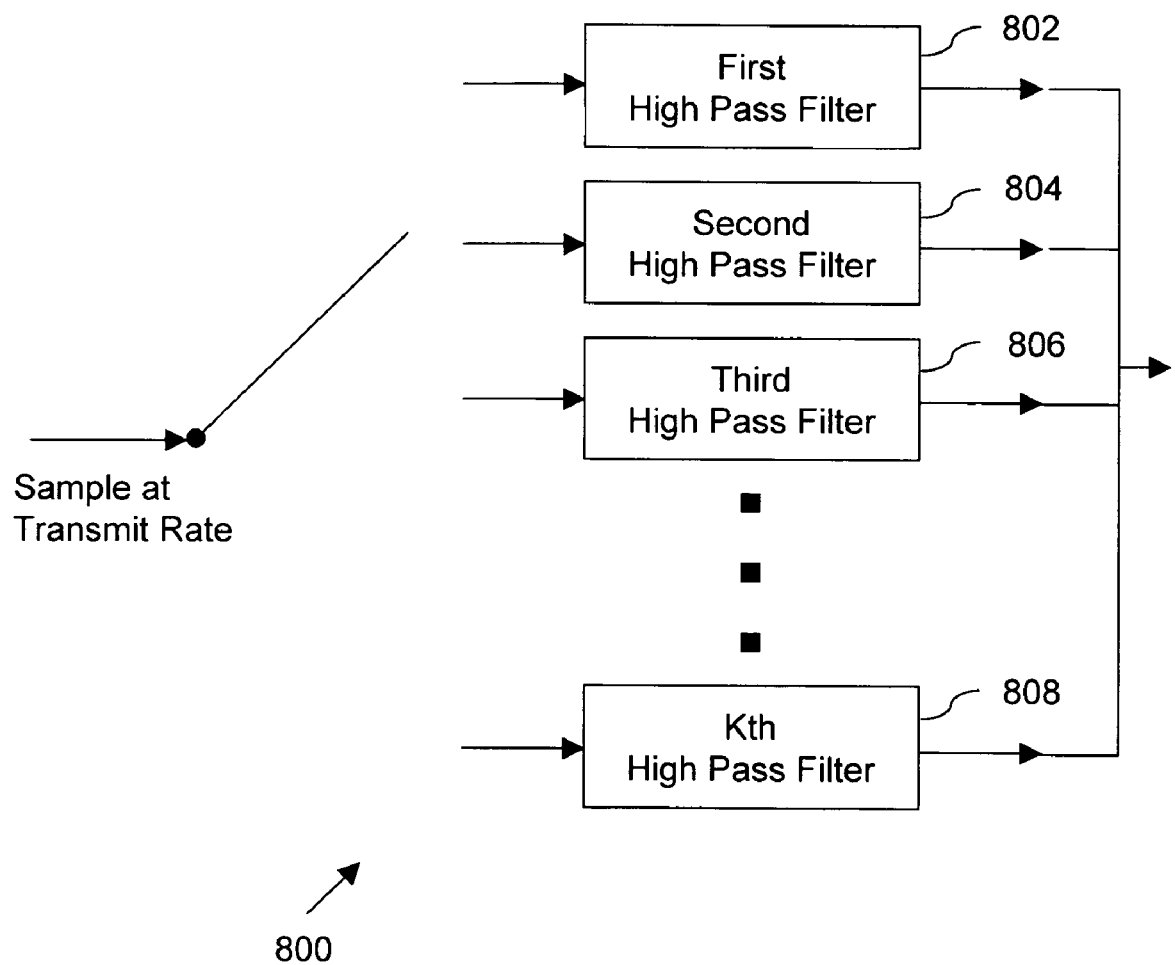
FIG. 8 is a block diagram illustrating a high pass filter, in accordance with an exemplary embodiment of the present invention.

FIG. 8 is a block diagram illustrating a high pass filter 800, in accordance with an exemplary embodiment of the present invention. High pass filter 800 is implemented in the form of filters-banks to reduce the computational load. High pass filter 800 comprises a first high pass filter 802, a second high pass filter 804, a third high pass filter 806, and other high pass filters up to a $K^{th}$ high pass filter 808. The filter bank implementation of the high pass filter and the down-sampler in combination reduces the computational complexity and load of echo canceller. The high pass filters are fed through an input multiplexer and the outputs of the different filters are added to generate one output. The output of each of the high pass filters is then taken to generate a composite data sample, which is fed to up-sampler 504. In an embodiment, the output of each of the high pass filters is taken to generate a composite data sample, which is fed to down-sampler 704.

In various embodiments of the invention, each of the system elements can be implemented in the form of hardware, software, firmware and their combination thereof. In particular, they can be implemented in the form of integrated circuits as a part of application specific integrated circuits (ASIC), System on Chip (SoC), and gate arrays. Further, they can be implemented in a digital signal processor (DSP).

Figure 9:
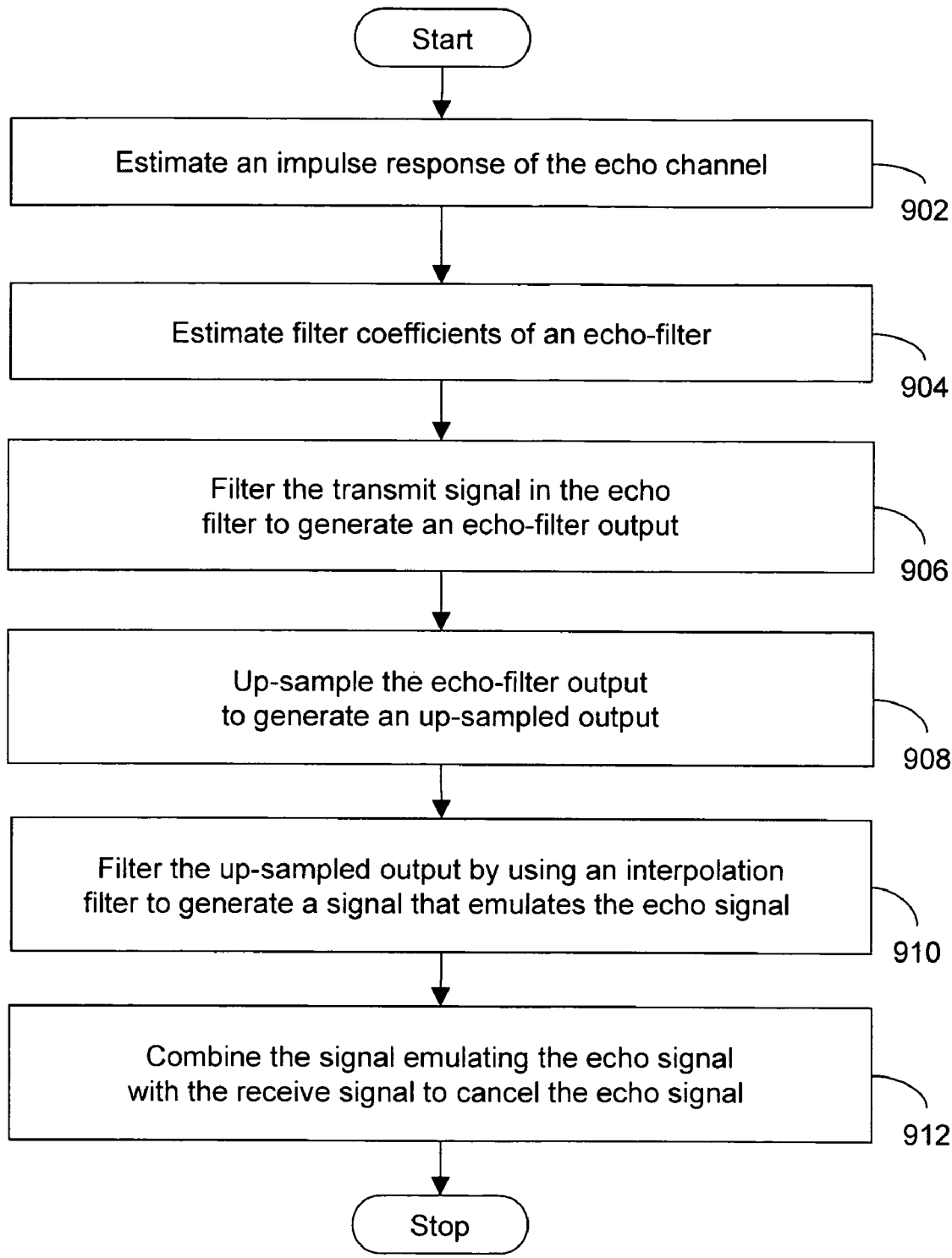
FIG. 9 is a flowchart illustrating a method for canceling echo, in accordance with an exemplary embodiment of the present invention.

FIG. 9 is a flowchart illustrating the method for canceling echo, in accordance with an exemplary embodiment of the present invention. At step 902, the impulse response of the echo channel is estimated. An exemplary method for estimating the impulse response of the echo channel is described in conjunction with FIG. 11. Then at step 904, the filter coefficients of an echo filter are estimated. In an embodiment of the present invention, echo filter coefficients are computed by down-sampling the band limited impulse response of the echo channel by a down-sampling factor. In an embodiment of the invention, down-sampling is done by dropping a pre-determined number of samples of the band-limited impulse response of the echo channel. The step of estimating the filter coefficients of the echo filter is described in detail, in conjunction with FIG. 10.

At step 906, the transmit signal is filtered in the echo filter to generate an echo filter output. The echo filter output is then up-sampled to generate an up-sampled output at step 908. Up-sampling of the echo filter output depends on the down-sampling factor, which is utilized for down-sampling the impulse response of the echo channel. In an embodiment of the present invention, up-sampling of the echo filter output is done by a zero-filling operation.

In an embodiment of the present invention, up-sampling of the echo filter output depends on a ratio between the receive rate and the transmit rate. For example, the up-sampling may be done by a factor of the ratio between the receive rate and the transmit rate or by a factor twice that value. The receive rate is greater than the transmit rate. It should be noted that the receive rate may also be equal to or less than the transmit rate.

Then at step 910, an interpolation filter is utilized for filtering the up-sampled output. The interpolation filter generates a signal that emulates the echo signal. Then at step 912, the signal emulating the echo signal is combined with the received signal to cancel the echo signal.

It is to be noted that the sequence of steps 906-910 described above are exemplary. The sequence of steps can be modified without deviating from the sprit and scope of the various embodiments of the present invention. Further, some of the steps can be combined without deviating from the scope of the present invention.

Figure 10:
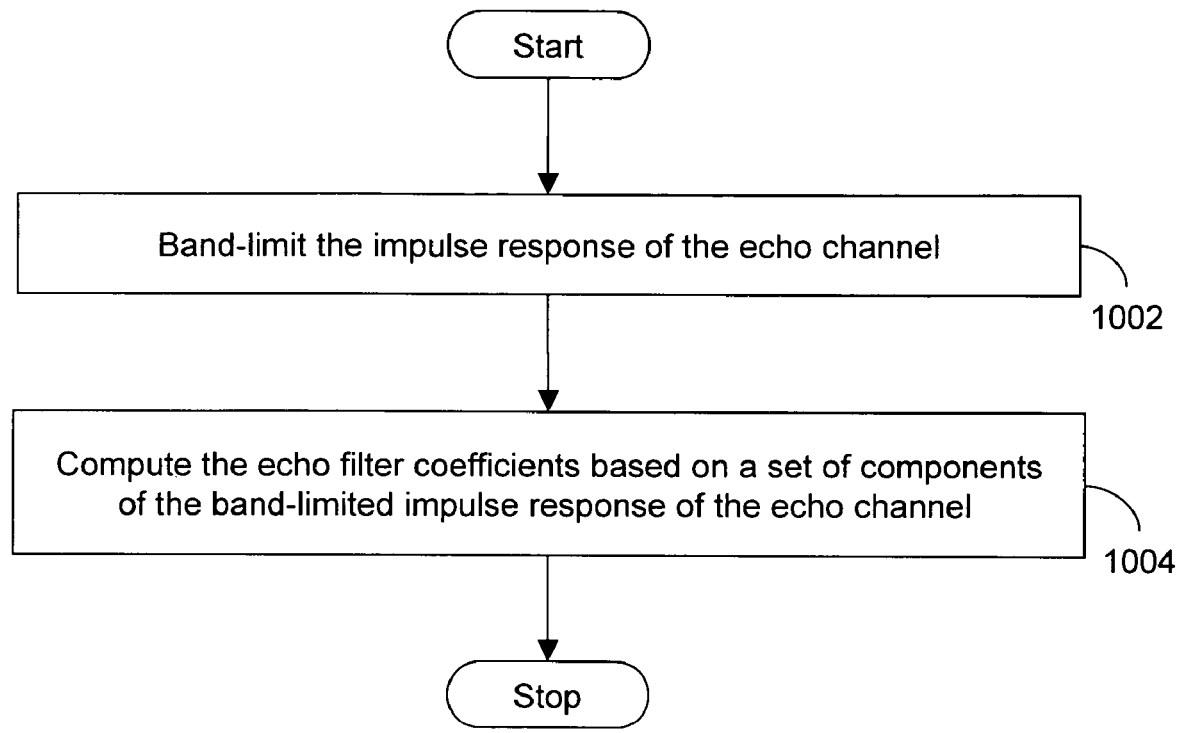
FIG. 10 is a flowchart illustrating a method for estimating filter coefficients of an echo filter, in accordance with an exemplary embodiment of the present invention.

FIG. 10 is a flowchart illustrating the method for estimating filter coefficients of an echo filter, in accordance with an exemplary embodiment of the present invention. At step 1002, the impulse response of the echo channel is band-limited. In band-limiting, the range of frequency band of the impulse response, which is not required, is filtered out. Then at step 104, the echo filter coefficients are computed based on a set of components of the band-limited impulse response of the echo channel. It is to be noted that the method of band limiting the impulse response is well known in the art and should be apparent to a person skilled in the art. For example, the impulse response may be limited to a required frequency band using a band-pass filter.

Figure 11:
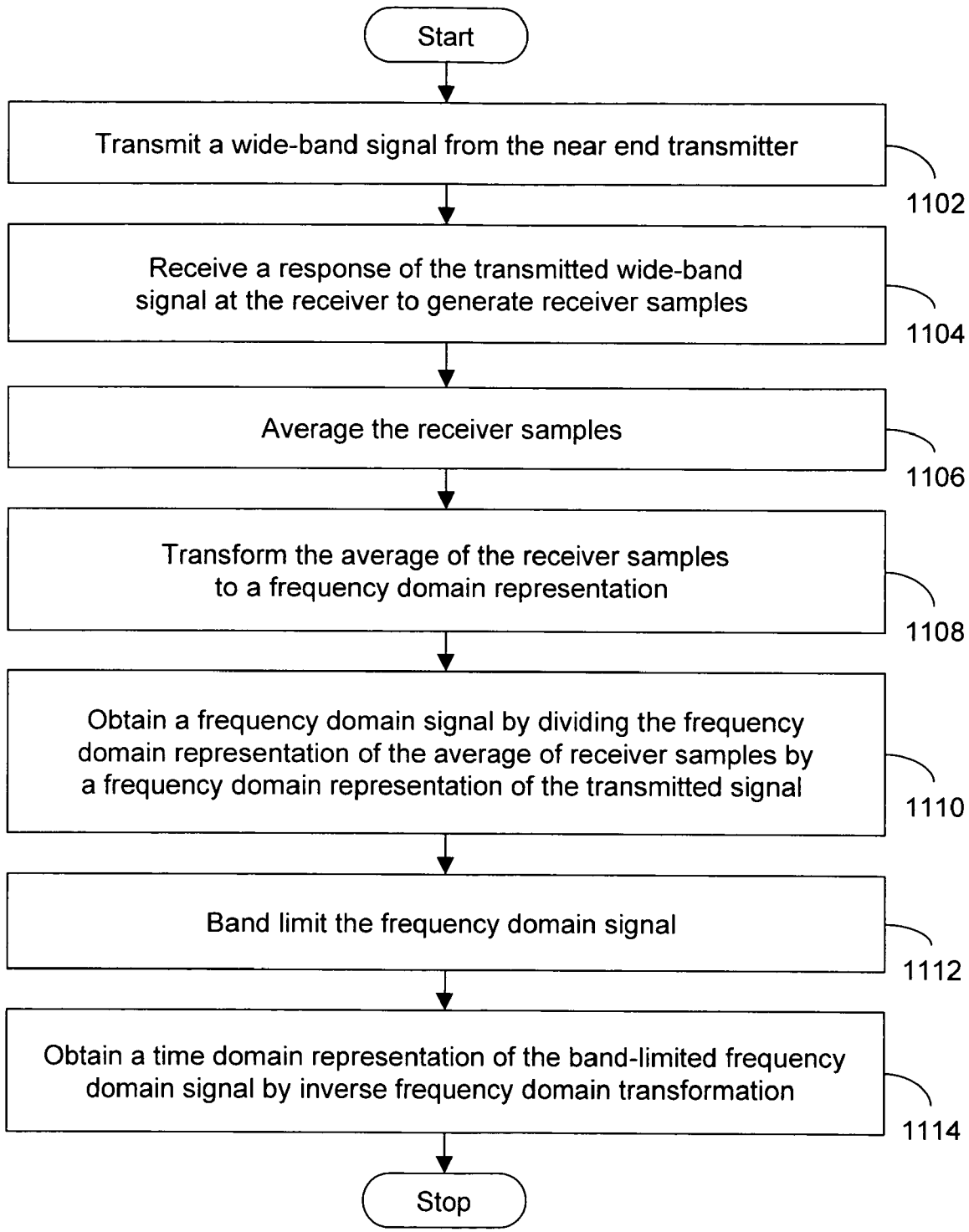
FIG. 11 is a flowchart illustrating a method for estimating the impulse response of an echo signal, in accordance with an exemplary embodiment of the present invention.

FIG. 11 is a flowchart illustrating the method for estimating the impulse response of an echo signal, in accordance with an exemplary embodiment of the present invention. At step 1102, a wide-band signal is transmitted from the near end transmitter. In an embodiment of the present invention, the wide-band signal includes a series of impulses. In another embodiment of the present invention, a frequency domain sweep signal is used instead of the wide-band signal.

At step 1104, a response of the transmitted wide-band signal is received at the receiver in order to generate receiver samples. The receiver samples are then averaged at step 1106. In an embodiment of the present invention, averaging of samples is carried out on a frame-to-frame basis. It is to be noted that averaging of samples may be carried out in other ways as well. For example, averaging may be done on the basis of two frames at a time or an octet at a time.

Then at step 1108, the average of the receiver samples is transformed to a frequency domain representation. At step 1110, a frequency domain signal is obtained by dividing the frequency domain representation of the average of receiver samples by a frequency domain representation of the transmitted signal. Then the frequency domain signal is band limited at step 1112. At step 1114, a time domain representation of the band-limited frequency domain signal is obtained by inverse frequency domain transformation.

The present invention provides a computationally efficient apparatus and method for removing echo signal from data communication systems. The computational efficiency of the apparatus is achieved through the appropriate structure of the different filters used in a scheme of echo canceller. Another advantage of the invention is that the training process for identifying the coefficients of the echo filter is simpler. The training process by using a known wide band signal avoids the risk of divergence of the training process.

The various embodiments or components thereof may be implemented as part of a computer system. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device can also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also hold data or other information as desired or needed. The storage element may be in the form of an information source or a physical memory element within the processing machine.

The set of instructions may include various commands that instruct the processing machine to perform specific operations such as the processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While the preferred embodiments of the invention have been illustrated and described, it will be clear that the invention is not limited to these embodiments only. Numerous modifications, changes, variations, substitutions, and equivalents will be apparent to those skilled in the art without departing from the spirit and scope of the invention as described in the claims.

What is claimed is:

1. Apparatus for canceling an echo signal in a communication system, the communication system comprising a near end transmitter and a receiver, the communication system transmitting data at a transmit rate through a transmit signal and receiving data at a receive rate through a receive signal, the receive signal including the echo signal introduced by the transmit signal, the apparatus comprising:
   a. at least one echo filter for filtering the transmit signal to generate an output, coefficients of the at least one echo filter being generated by estimating a band-limited impulse response of an echo channel;
   b. at least one up-sampler for up-sampling the output of the at least one echo filter;
   c. at least one interpolation filter for filtering the up-sampled output to generate a signal that emulates the echo signal; and
   d. a signal combining apparatus for combining the signal emulating the echo signal and the receive signal.

2. The apparatus of claim 1 further comprises a down-sampler for down-sampling the band-limited impulse response, wherein components of the down-sampled band-limited impulse response are used for generating coefficients of the at least one echo filter.

3. The apparatus of claim 1, wherein the up-sampling of the output of at-least one echo filter is carried out by a factor equal to the ratio between the receive rate and the transmit rate.

4. The apparatus of claim 1, wherein the at least one echo filter is a non-adaptive filter.

5. The apparatus of claim 1, wherein the at least one echo filter is an adaptive filter.

6. The apparatus of claim 1, wherein the at least one interpolation filter is connected in parallel with respect to the up-sampled output, each of the at least one interpolation filters generating output samples at the receive rate.

7. The apparatus of claim 1, wherein the receive rate is greater than the transmit rate.

8. Apparatus for canceling an echo signal in a communication system, the communication system comprising a near end transmitter and a receiver, the communication system transmitting data at a transmit rate through a transmit signal and receiving data at a receive rate through a receive signal, the receive signal including the echo signal introduced by the transmit signal, the apparatus comprising:
  a. at least one up-sampler for up-sampling the transmit signal;
  b. at least one echo filter for filtering the up-sampled transmit signal to generate an echo filter output, coefficients of the at least one echo filter being generated by estimating a band-limited impulse response of an echo channel;
  c. at least one interpolation filter for filtering the echo filter output to generate a signal that emulates the echo signal; and
  d. at least one signal combining apparatus for combining the signal emulating the echo signal and the receive signal.

9. The apparatus of claim 8 further comprises at least one high-pass filter for filtering the transmit signal before feeding the transmit signal to the at least one up-sampler.

10. The apparatus of claim 9, wherein the at least one high-pass filter is at least one of a linear phase filter and a finite impulse response filter.

11. The apparatus of claim 9 further comprises at least one down-sampler for down-sampling the high-pass-filtered transmit signal before feeding the high-pass-filtered transmit signal to the at least one up-sampler.

12. The apparatus of claim 9, wherein the at least one high-pass-filter comprises a second set of filters, each filter of the second set of filters filtering mutually exclusive components of the transmit signal, an output of the second set of filters being generated, the generation of the output of the second set of filters comprising:
  a. feeding each filter of the second set of filters with one sample each to generate an output of each filter of the second set of filters; and
  b. adding the outputs of each filter of the second set of filters.

13. The apparatus of claim 8, wherein the at least one echo filter comprises a first set of filters connected in parallel, each of the first set of filters being operated for generating one output sample at receive rate.

14. A method of canceling an echo signal in a communication system, the communication system comprising a near end transmitter and a receiver, the echo signal being generated in an echo channel existing between the near end transmitter and the receiver, the communication system transmitting data at a transmit rate through a transmit signal and receiving data at a receive rate through a receive signal, the receive signal including the echo signal introduced by the transmit signal, the method comprising the steps of:
  a. estimating an impulse response of the echo channel;
  b. estimating filter coefficients of an echo filter, the step of estimating filter coefficients of the echo filter comprising:
    i. band-limiting the impulse response of the echo channel; and
    ii. computing the echo filter coefficients based on a set of components of the band-limited impulse response of the echo channel;
  c. filtering the transmit signal in the echo filter to generate an echo filter output;
  d. up-sampling the echo filter output to generate an up-sampled output;
  e. filtering the up-sampled output by using an interpolation filter to generate a signal that emulates the echo signal; and
  f. combining the signal emulating the echo signal with the receive signal to cancel the echo signal.

15. The method according to claim 14, wherein estimating the impulse response of the echo signal comprises the steps of:
  a. transmitting a wide-band signal from the near end transmitter;
  b. receiving a response of the transmitted wide-band signal at the receiver to generate receiver samples;
  c. averaging the receiver samples;
  d. transforming the average of the receiver samples to a frequency domain representation;
  e. obtaining a frequency domain signal by dividing the frequency domain representation of the average of receiver samples by a frequency domain representation of the transmitted signal;
  f. band-limiting the frequency domain signal; and
  g. obtaining a time domain representation of the band-limited frequency domain signal by inverse frequency domain transformation.

16. The method of claim 15, wherein the wide-band signal comprises a series of impulses.

17. The method according to claim 14, wherein up-sampling of the echo filter output depends on a ratio between the receive rate and the transmit rate.

18. The method according to claim 14, wherein computation of the echo filter coefficients is done by down-sampling the band-limited impulse response of the echo channel by a down-sampling factor.

19. The method according to claim 18, wherein the down-sampling is done by dropping a pre-determined number of samples of the band-limited impulse response of the echo channel.

20. The method according to claim 18, wherein up-sampling of the echo filter output depends on the down-sampling factor.

21. The method according to claim 14, wherein the receive rate is greater than the transmit rate.

22. The method according to claim 14, wherein up-sampling of the echo filter output is done by a zero-filling operation.

23. The method according to claim 14, wherein the method of canceling an echo signal in a communication system is implemented as a computer program product.

* * * * *